(12) United States Patent
Nakagawa et al.

(10) Patent No.: US 6,932,405 B2
(45) Date of Patent: Aug. 23, 2005

(54) VEHICLE BODY FRAME STRUCTURE

(75) Inventors: Hayami Nakagawa, Anjo (JP); Satoshi Yanagimoto, Susono (JP); Yusuke Kimura, Susono (JP)

(73) Assignees: Mitsubishi Jidosha Kogyo Kabushiki Kaisha (JP); Mitsubishi Aluminum Co., Ltd. (JP)

( * ) Notice: Subject to any disclaimer, the term of this patent is extended or adjusted under 35 U.S.C. 154(b) by 0 days.

(21) Appl. No.: 10/830,707

(22) Filed: Apr. 23, 2004

(65) Prior Publication Data
US 2005/0062307 A1 Mar. 24, 2005

(30) Foreign Application Priority Data

Apr. 23, 2003 (JP) ........................................ 2003-118393

(51) Int. Cl.⁷ .............................................. B62S 27/02
(52) U.S. Cl. .................... 296/29; 296/30; 296/203.03; 296/205; 296/187.12
(58) Field of Search ..................... 296/29, 30, 187.01, 296/187.12, 203.01, 203.03, 204, 205, 209, 193.07, 193.05, 193.01

(56) References Cited

U.S. PATENT DOCUMENTS

| | | | | |
|---|---|---|---|---|
| 4,557,519 A | * | 12/1985 | Matsuura | 296/204 |
| 6,302,478 B1 | * | 10/2001 | Jaekel et al. | 296/205 |
| 6,402,414 B1 | * | 6/2002 | Kanodia et al. | 403/230 |
| 6,412,857 B2 | * | 7/2002 | Jaekel et al. | 296/205 |
| 6,416,117 B1 | * | 7/2002 | Weiman | 296/204 |
| 6,540,286 B2 | * | 4/2003 | Takemoto et al. | 296/204 |
| 6,604,781 B2 | * | 8/2003 | Uchida | 296/204 |
| 6,676,200 B1 | * | 1/2004 | Peng | 296/204 |
| 6,758,516 B1 | * | 7/2004 | Abramczyk et al. | 296/187.12 |
| 6,786,534 B1 | * | 9/2004 | Peng | 296/187.08 |
| 6,834,912 B2 | * | 12/2004 | Cardimen et al. | 296/204 |
| 6,869,136 B2 | * | 3/2005 | Igarashi et al. | 296/204 |

FOREIGN PATENT DOCUMENTS

JP 10-314869 A 12/1998

* cited by examiner

Primary Examiner—D. Glenn Dayoan
Assistant Examiner—Greg Blankenship
(74) Attorney, Agent, or Firm—Rossi, Kimms & McDowell, LLP

(57) ABSTRACT

A vehicle body structure of the present invention includes a side-frame disposed to extend along one direction, a side sill disposed to extend in the one direction alongside the side-frame on the outside thereof, a cross member disposed to extend in a direction in which the cross member intersects with the side-frame and which is joined to a side portion of the side-frame to form a vehicle body together with the side-frame, and a gusset provided between the side-frame and the side sill on a longitudinal extension of the cross member, which extends in a smaller cross section than that of the cross member from a joint portion where the cross member is joined to the side-frame until the gusset comes into abutment with the side sill while passing through the side-frame and which is formed as an integral part of the cross member.

8 Claims, 3 Drawing Sheets

VEHICLE BODY FRAME STRUCTURE

CROSS REFERENCE TO RELATED APPLICATION

This non-provisional application incorporates by reference the subject matter of Application No. 2003-118393 filed in Japan on Apr. 23, 2003, on which a priority claim is based under 35 U.S.C. §119(a)

BACKGROUND OF THE INVENTION (1) Field of the Invention

The present invention relates to a vehicle body structure of an automobile.

(2) Description of the Related Art

In vehicle body frames of automobiles, with a view to securing safety, the rigidity of a part of a vehicle body where occupants ride is increased by adopting a framework in which side-frames which extend in a longitudinal direction of the vehicle body and cross members which are joined to the side-frames from a transverse direction of the vehicle body are combined together. For example, such a vehicle body frame is disclosed in JP-A-10-314869.

In addition, with a view to increasing the safety with respect to impacts to sides of a vehicle or side-impacts, vehicle body frame structures are adopted in which side sills are disposed in parallel alongside the side-frames on the outside thereof, and impact absorbing members are provided between the side-frames and the side sills so disposed. Normally, the impact absorbing members are, for example, members of a hollow cross section which are adapted to be deformed earlier than the cross members when an impact force of a predetermined value or greater is inputted sideways to the side sills. Impact energy exerted sideways on the side sill is absorbed by virtue of the deformation of the relevant member, so that the impact force so exerted is lessened.

On the other hand, cost reductions are demanded in vehicle body frames as well as other parts of the automobiles. However, since the structure in which the impact absorbing members are additionally provided between the side-frame members and the side sill members increase the number of components associated with the vehicle body frame, there is a problem that a cost-related burden is increased.

SUMMARY OF THE INVENTION

It is an object of the invention to provide a vehicle body structure resulting from a combination of members which are different in cross-sectional area or members which are different in strength and rigidity, while attempting to decrease the number of components involved.

With a view to attaining the object, according to the invention, there is provided with a vehicle body structure including: a first member disposed to extend along one direction; a second member disposed to extend along the one direction at an outside of the first member from the vehicle body; a third member disposed to extend in a direction in which the third member intersects with the first member and joined to a side portion of the first member, so that the vehicle body is formed together with the first member; and a fourth member provided between the first member and the second member on a longitudinal extension of the third member, which extends in a smaller cross section than a cross section of the third member from a joint portion where the third member is joined to the first member until the fourth member comes into abutment with the second member while passing through the first member integrally formed with the third member.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE INVENTION

The present invention will now be described in detail with reference to the accompanying drawings showing preferred embodiments thereof. It is to be understood, however, that the dimensions, materials, shapes, and arrangements of component parts should not be restricted to the following embodiments, but changes within the purview of the appended claims may be made without departing from the true scope.

Figure 1:
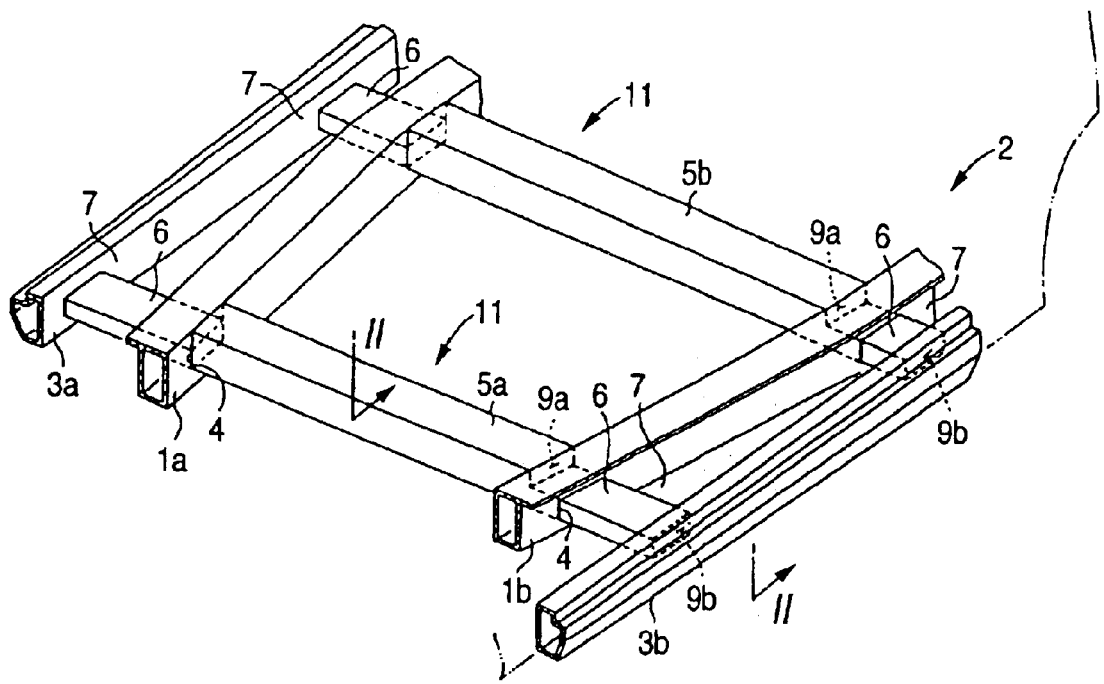
FIG. 1 is a perspective view showing a vehicle body frame structure according to a first embodiment of the invention.
Figure 2:
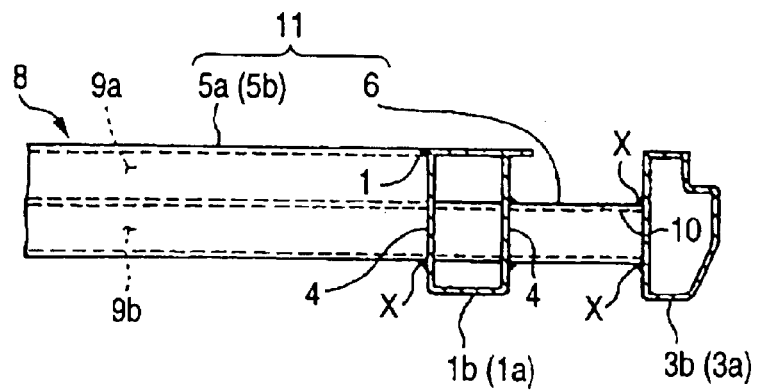
FIG. 2 is a cross-sectional view taken along the line II—II in FIG. 1.
Figure 3:
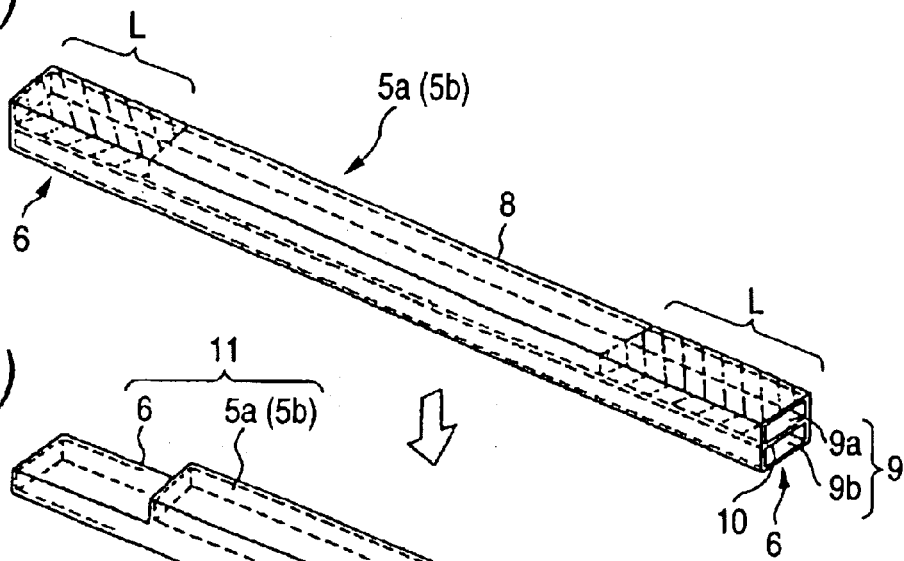
FIG. 3A is a perspective view showing an extruded member for integrating a cross member and a gusset into a single component.
FIG. 3B is a perspective view showing an extruded member in which gussets of a smaller cross section are formed at ends thereof by cutting.
Figure 3:
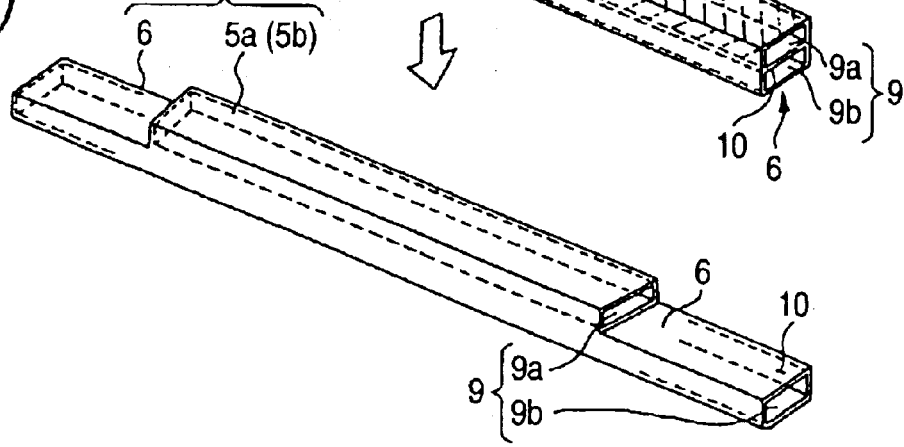

The invention will be described below based on a first embodiment shown in FIGS. 1 to 3. FIG. 1 shows part of a vehicle body frame structure of an automobile (a vehicle) to which the invention is applied, and FIG. 2 shows a cross section taken along the line II—II in FIG. 1. Reference characters 1a, 1b in FIG. 1 denote side-frames (first members) which form a vehicle body frame 2 by being disposed in pair on both sides of a vehicle body in a transverse direction thereof. Either of the side-frames 1a, 1b uses, for example, a rectangular tube-like member which extends in a longitudinal direction (one direction) of the vehicle body. A pair of side sills 3a, 3b (second members) are disposed on the both sides of the vehicle body in the transverse direction to be alongside the side-frames 1a, 1b on the outside thereof. The side sills 3a, 3b are parts in the vehicle body frame structure which are disposed on outermost sides thereof, and either of the side sills is formed by a tubular member which extends in the longitudinal direction of the vehicle body.

Reference characters 5a, 5b denote cross members (third members) which are disposed at respective locations (here, two locations) between the side-frames 1a, 1b. Either of the cross members 5a, 5b is formed by a rectangular tube-shaped member which extends in the transverse direction. Then, ends of the cross members 5a, 5b are joined to side portions of the side-frames 1a, 1b, respectively from a direction which intersects with the side-frames 1a, 1b. Being so joined to the side-frames 1a, 1b, the cross members 5a, 5b forms a vehicle body framework arranged in a double cross shape in cooperation with the side-frames 1a, 1b. This double cross structure serves to increase the rigidity of part of the vehicle body where occupants ride.

Gussets 6 (fourth members) having a cross section made smaller than a general cross section of the cross members 5a, 5b are formed at transverse end portions of each cross member 5a, 5b as an integral part thereof. As shown in FIGS. 1 and 2, the respective gussets 6 which are integrated into the cross members 5a, 5b extend from joint portions where the cross members 5a, 5b are joined to the side-frames 1a, 1b to pass through through holes 4 formed in side walls of the respective side-frames 1a, 1b until they come into abutment with sides of the side sills 3a, 3b disposed on the outermost sides of the vehicle body structure.

Then, portions of the gussets 6 which pass through the side-frames 1a, 1b and abutment faces (end surfaces) of the gussets 6 are fixed around the whole circumference thereof to circumferential edge portions of the respective through holes 4 and the sides of the side sills 3a, 3b, respectively, by welding for example. Reference character X shown in FIG. 2 denotes locations where such welding is provided. The rigidity of the vehicle body framework is increased by the gussets 6 which are extended between the side-frames 1a, 1b and the side sills 3a, 3b. In addition, impact absorbing portions 7 are formed between the side sills 3a, 3b and the side-frames 1a, 1b for absorbing an impact force exerted sideways on the side sills 3a, 3b from a transversely outside location thereof by making use of the gussets 6 of the smaller cross section. Namely, the gussets 6 are designed to be deformed earlier than the cross members 5a, 5b so as to absorb impact energy when an impact force of a predetermined value or greater is inputted sideways to the side sills 3a, 3b from a transversely outside location thereof by making use of the fact that the rigidity of the gussets 6 is smaller than that of the main parts of the cross members 5a, 5b (i.e. the fact that the cross section of the gussets 6 is smaller than the general cross section of the cross members 5a, 5b).

In addition, an elongate extruded material 8 having in the interior thereof hollow sections 9 which continue in the longitudinal direction of the vehicle body as shown in FIG. 3A is designed to be used to form the cross members 5a, 5b with a view to integrating the impact absorbing portions 7 into the cross members 5a, 5b. To make this happen, as the extruded material 8, for example, an extruded material having a full length resulting from the addition of the length of the gussets 6 to the length of the cross members 5a, 5b is used, and areas L at ends of the extruded member where the gussets 6 are formed are designed to be worked so as to provide thereat a smaller hollow cross section than the general hollow cross section of the extruded material 8. To be specific, in order to obtain a member main body 11 in which the cross member 5a, 5b and the gussets 6 are integrated into a single body, as the extruded material 8 constituting the cross member 5a, 5b, a hollow aluminum extruded material is used which is a rectangular tube-shaped member and which has in the interior thereof a plurality of hollow portions 9 divided by a partition wall 10 which continues along an extruded direction. Here, a hollow aluminum extruded material is used which is, as shown in FIG. 3A, vertically divided into two sections so as to form two rectangular hollow sections which are arranged vertically in parallel with each other.

Needless to say, the full length of the extruded material 8 then includes two locations (2L) where the gussets 6 are formed. As shown in FIG. 3A, the gusset 6 is formed by cutting at each area L part of the hollow sections or a portion where the upper hollow section 9a indicated by inclined double-dashed lines in FIG. 3 exists so as to reduce the original hollow cross section of the extruded material 8 substantially to a half thereof at the relevant area.

With the construction in which the impact absorbing portions 7 are formed between the side-frames 1a, 1b and the side sills 3a, 3b by using the gussets 6 having smaller cross section formed at the end portions of the cross members 5a, 5b, since the impact absorbing portions 7 are not separate from but are integrated into the cross members 5a, 5b as an integral part thereof, the number of components needed to form the impact absorbing portion 7 can be decreased.

Thus, a reduction in cost can be attempted. Moreover, since the gussets 6 are made to pass through the side frames 1a, 1b, a higher support strength can be secured when compared with a construction where separate parts are interposed between the side-frames 1a, 1b and the side sills 3a, 3b. Thus, a high rigidity for the vehicle body frame structure can be achieved. In addition, positioning at the time of assembling a vehicle body frame 2 is facilitated.

Further, for the integration of the impact absorbing portions into the cross members, since the construction is adopted where the cross member 5a, 5b is formed of the rectangular extruded member 8, and the end portions of the extruded member 8 are worked so as to provide the smaller hollow cross sections thereat, the cross member 5a, 5b and the gussets 6 can be integrated into a single part with a simple construction. In particular, when adopting the construction where the cross member 5a, 5b is formed of the extruded material 8 in which the plurality of hollow sections 9a, 9b are arranged in parallel, and the gussets 6 are formed by removing part of the hollow sections 9a, 9b, the integration of the cross member 5a, 5b and the gussets 6 can be realized with a simpler construction.

Figure 4:
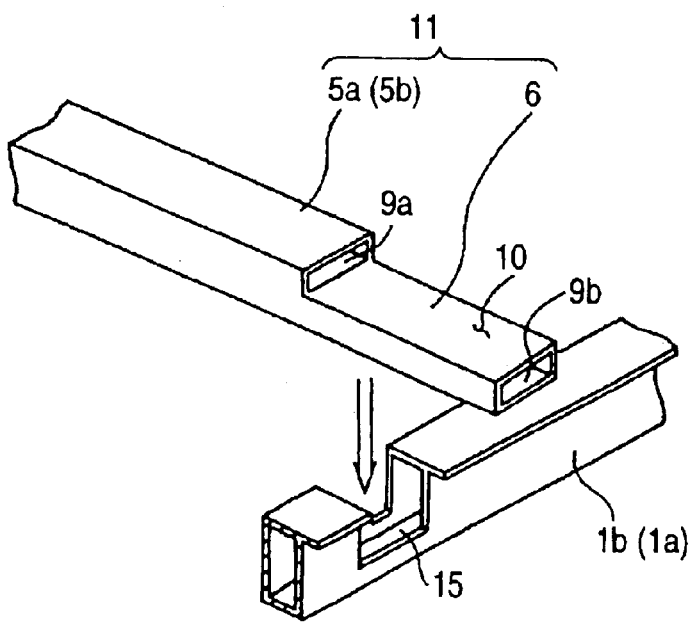
FIG. 4 is a perspective view showing a process where a gusset which forms a subject matter of a second embodiment is fitted into a recessed portion in a side-frame.
Figure 5:
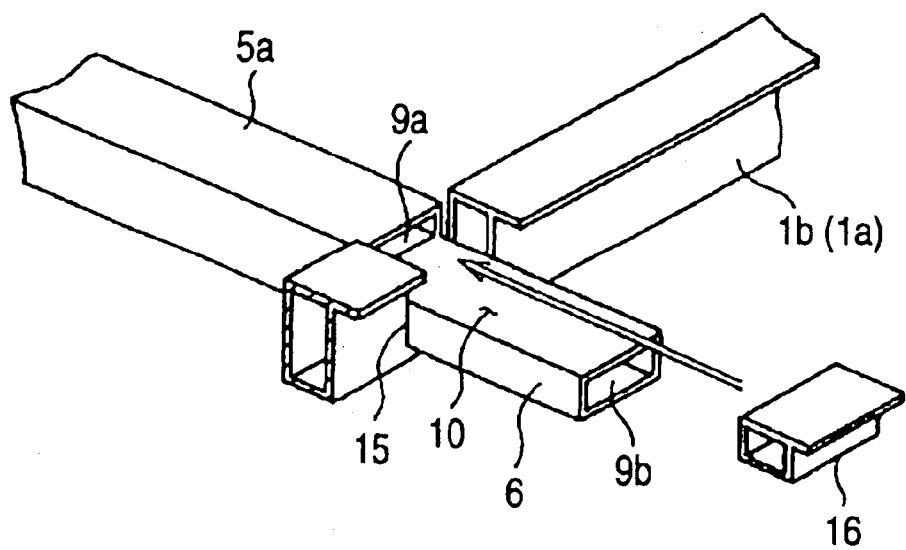
FIG. 5 is a perspective view which explains the closure of an open portion which remains in the recessed portion after the gusset has been fitted into the recessed portion.
Figure 6:
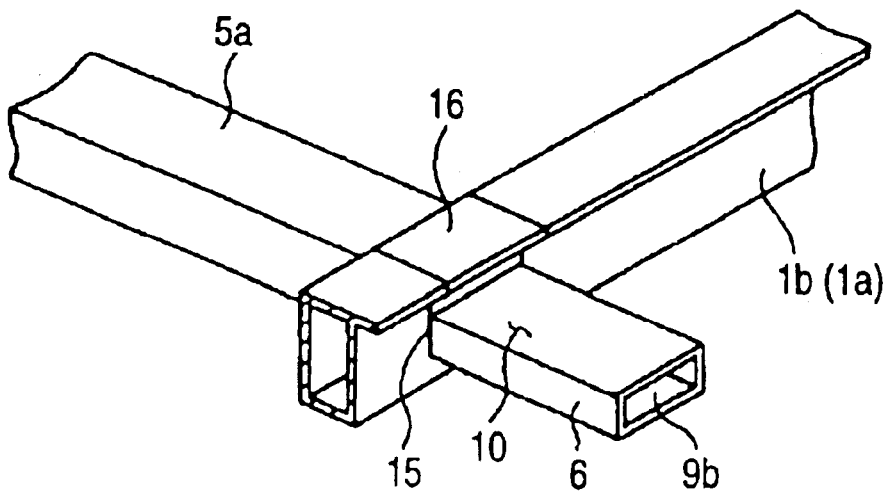
FIG. 6 is a perspective view showing a state where the assembly of the gusset into the side-frame has been completed.

FIGS. 4 to 6 illustrates a second embodiment of the invention. While, in the first embodiment, the member main body 11 is assembled to the side-frames 1a, 1b by inserting the gussets 6 into the through holes 4, in this embodiment, notch portions are formed in side-frames 1a, 1b so that a member main body 11 is assembled to the side-frames 1a, 1b.

To be specific, as shown in FIG. 4, a recessed portion 15 is formed in an upper portion of the side-frame 1a or 1b so that the gusset 6 can be pulled in or out from the recessed portion. The recessed portion 15 is formed by a rectangular notch portion which is cut out to such a size that allows the cross section of the gusset 6 is received in a central portion of the side-frame 1a. In assembling the member main body 11 to the side-frame 1a or 1b, as shown in FIG. 5, a proximal portion of the gusset 6 which is located at the end of the cross member 5a (or 5b) is fitted in the recessed portion 15, and thereafter, an open portion which remains in the recessed portion 15 is closed with a closing member 16. Then, after the closing member 16 is secured by welding, for example, a portion of the gusset 6 which passes through the side-frame 1a is secured around the full circumference thereof to the side-frame 1a and the closing member 16 by welding, for example, whereby the assembly of the member main body 11 to the side-frame 1a is performed as shown in FIG. 6.

When compared with the assembling structure of the first embodiment in which the gusset 6 is inserted through the through hole 4, the assembling structure of the second embodiment provides an advantage that the gusset can be assembled to the side-frame 1a to intersect therewith without needing high accuracy. However, like reference characters/numerals are imparted to like parts to those described in the first embodiment, and the description thereof will be omitted herein.

Note that the invention is not limited to the respective embodiments that have been described heretofore, but may be modified in various ways without departing the sprit and scope of the invention. For example, while, in the aforesaid embodiments, the example is raised where the impact absorbing portions are formed between the side-frame 1a and the side sill 3a, the invention is not limited thereto, and for example, gussets are formed at ends of the side-frames for application to a case where impact absorbing portions are formed between a cross member disposed at a front or rear part of the vehicle body and a member which is disposed transversely outwardly of the cross member.

What is claimed is:

1. A vehicle body frame structure comprising:

a first member disposed to extend along one direction;

a second member disposed to extend along the one direction at an outside of the first member from the vehicle body;

a third member disposed to extend in a direction in which the third member intersects with the first member and joined to a side portion of the first member, so that the vehicle body is formed together with the first member; and a fourth member provided between the first member and the second member on a longitudinal extension of the third member, which extends in a smaller cross section than a cross section of the third member from a joint portion where the third member is joined to the first member until the fourth member comes into abutment with the second member while passing through the first member, the fourth member is integrally formed with the third member.

2. The vehicle body structure according to claim 1, wherein the third member and the fourth member are formed of an extruded material in which a hollow section continues in a longitudinal direction of the extruded material.

3. The vehicle body structure according to claim 2, wherein the fourth member is formed by working an area of the extruded material where the fourth member is formed so that said area is made to be a smaller hollow cross section than a hollow cross section of the extruded material.

4. The vehicle body structure according to claim 3, wherein the extruded material is formed to have a plurality of hollow sections which are arranged in parallel, and wherein the fourth member is formed by removing a portion where at least one of the hollow sections is located at the area.

5. The vehicle body structure according to claim 1, wherein the fourth member is an impact absorbing member to be deformed with an impact force which is smaller than an impact force with which the third member is deformed when an impact force is inputted sideways to the second member.

6. The vehicle body structure according to claim 1, wherein the fourth member passes through a through hole in a side wall of the first member and extends until the fourth member comes into abutment with the second member.

7. The vehicle body structure according to claim 1, wherein the fourth member passes through a recessed portion formed in the first member by cutting a part of the first member and extends until the fourth member comes into abutment with the second member.

8. The vehicle body structure according to claim 7, wherein a portion of the recessed portion through which the fourth member does not pass is closed by a closing member.

* * * * *